United States Patent [19]

Yamaguchi et al.

[11] Patent Number: 5,743,611
[45] Date of Patent: Apr. 28, 1998

[54] PROJECTOR

[75] Inventors: Makoto Yamaguchi, Kanagawa; Noriaki Negishi, Tokyo; Hisaharu Nakao, Chiba, all of Japan

[73] Assignee: Sony Corporation, Tokyo, Japan

[21] Appl. No.: 725,467

[22] Filed: Oct. 4, 1996

[30] Foreign Application Priority Data

Oct. 13, 1995 [JP] Japan ................................ 7-265952

[51] Int. Cl.⁶ ...................................... G03B 21/14
[52] U.S. Cl. ........................ 353/31; 353/60; 349/58; 349/5
[58] Field of Search ........................ 353/56, 57, 60, 353/61, 52, 31, 34, 37, 119; 349/161, 5, 8, 58

[56] References Cited

U.S. PATENT DOCUMENTS

| | | | |
|---|---|---|---|
| 4,763,993 | 8/1988 | Vogeley et al. | 350/331 |
| 4,904,079 | 2/1990 | Yoshimura et al. | 353/60 |
| 4,950,072 | 8/1990 | Honda | 353/61 |
| 5,032,021 | 7/1991 | Kanatani et al. | 353/52 |
| 5,076,543 | 12/1991 | Mandai | 349/161 |
| 5,170,195 | 12/1992 | Akiyama et al. | 353/52 |

FOREIGN PATENT DOCUMENTS

| | | | |
|---|---|---|---|
| 0422587 | 4/1991 | European Pat. Off. | G02F 1/1333 |
| 0601210 | 6/1994 | European Pat. Off. | G02F 1/1333 |
| 0646828 | 4/1995 | European Pat. Off. | G02F 1/13 |
| 57-000617 | 1/1982 | Japan | G02F 1/133 |
| 2287430 | 11/1990 | Japan | G02F 1/1335 |
| 3094225 | 4/1991 | Japan | G02F 1/1335 |

Primary Examiner—William Dowling
Attorney, Agent, or Firm—Jay H. Maioli

[57] ABSTRACT

A projector for magnifying and projecting an image displayed on LCDs and illuminated by a light source through a projecting lens is designed so that the adherence of dust to the LCDs and the rise of the temperature of the LCDs is suppressed. The peripheral portions of the LCDs are supported by supporting frames. And, the LCDs are hermetically held by a front side glass and a rear side glass which are closely mounted to the peripheral portions of the supporting frames with an adhesive.

9 Claims, 5 Drawing Sheets

PROJECTOR

FIELD OF THE INVENTION

The present invention relates to a projector for projecting an image displayed on an image display panel onto a screen through a projecting lens.

BACKGROUND OF THE INVENTION

There has been heretofore proposed a projector which is arranged to display an image on an image display panel as used in the so-called liquid crystal display and expansively project the image onto a screen through the effect of a projecting lens. This type of projector needs a light source like a halogen lamp for applying relatively large quantity of light onto the image display panel, because the projector is required to project a sufficiently bright image onto the screen. That is, an image displayed on the image display panel through the projecting lens and illuminated by the light source on the screen is formed as a real image.

In the aforementioned type of projector, illuminated by the light source, the image display panel is heated by the light source and the temperature of the panel rises. If the image display panel is heated up to a higher temperature than predetermined, it may be unable to properly display the image or it may break.

Lower luminance of the light source can suppress the rise of the temperature of the image display panel. In order to project a sufficiently bright image on the screen, however, the projector has to use a lamp with high luminance. Hence, it is difficult to employ the means of lowering the luminance of the light source for suppressing the rise of the temperature of the image display panel.

To prevent the rise of the temperature of the image display panel, the projector uses a cooling fan for cooling down the image display panel. This cooling fan is attached on a housing in a manner to match to an opening formed on the housing. The housing holds the light source, the image display panel and the projecting lens. The cooling fan serves to inject air into the housing and blow the air to the image display panel for cooling it down.

If, however, the image display panel is cooled down by outside air blown thereto, the dust contained in the outside air may adhere to the image display panel. If an air filter is attached to the opening of the housing for removing the dust, the air filter is not effective in completely removing the dust for a long time.

If the dust adheres to the image display panel, the shadow of the dust is projected on the screen. This makes it impossible to implement the clear formation of an image on the screen.

SUMMARY OF THE INVENTION

It is an object of the present invention to provide a projector having an image display panel to which the adherence of dust is suppressed.

According to an aspect of the invention, a projector includes an image display panel for displaying an image based on a video signal fed thereto, a light source for illuminating the image display panel, and a projecting lens for projecting an image displayed on the image display panel and illuminated by the light source, in which the image display panel is supported by supporting frames and hermetically held by a front side glass and a rear side glass whose surrounding portions are supported by these supporting frames.

The hermetically held image display panel serves to prevent the dust contained in outside air to be injected for cooling down the display panel.

In the projector, the front side glass through which a light flux travels from the light source to the image display panel is composed by uniformly coating aluminium fine powder on the surface and sintering the powder-coated glass.

In the projector, the front side glass through which a light flux travels from the light source to the image display panel is made of quartz glass.

In the projector, the front side glass through which a light flux traveled from the light source to the image display panel includes a metallic film on the surface of the glass and has the same characteristic as a neutral density filter (ND filter).

In operation, the projector is arranged to keep an air layer between the image display panel and the front side glass through which the light flux incident from the light source to the image display panel is transmitted. And, as mentioned above, the front side glass is composed by uniformly coating aluminum minute powder on the surface thereof and sintering the powder-coated surface. Or, the front side glass is made of quartz glass. This composition serves to cut off heat conducted from the front side glass to the image display panel and make the heat radiation of the front side glass excellent for suppressing the rise of the temperature of the image display panel.

Since the front side glass contains a metallic film on the surface thereof, the front side glass serves as a neutral density filter (ND filter) having a certain transmittance in a certain wavelength band. By properly setting the transmittance of the front side glass, it is possible to adjust the volume of the light flux incident on the image display panels for each color component of the image and the balance of the incident light volume about the image display panel for each color. That is, by setting the transmittance of the front side glass, it is possible to set the light volume ratio of each color component transmitted through each color image display panel therefore keeping the colors of the projected image well-balanced.

Other objects and advantages of the present invention will become apparent from the detailed description to follow taken in conjunction with the appended claims.

DESCRIPTION OF THE PREFERRED EMBODIMENTS

Later, the description will be oriented to a projector according to an embodiment of the present invention with reference to the drawings.

Figure 1:
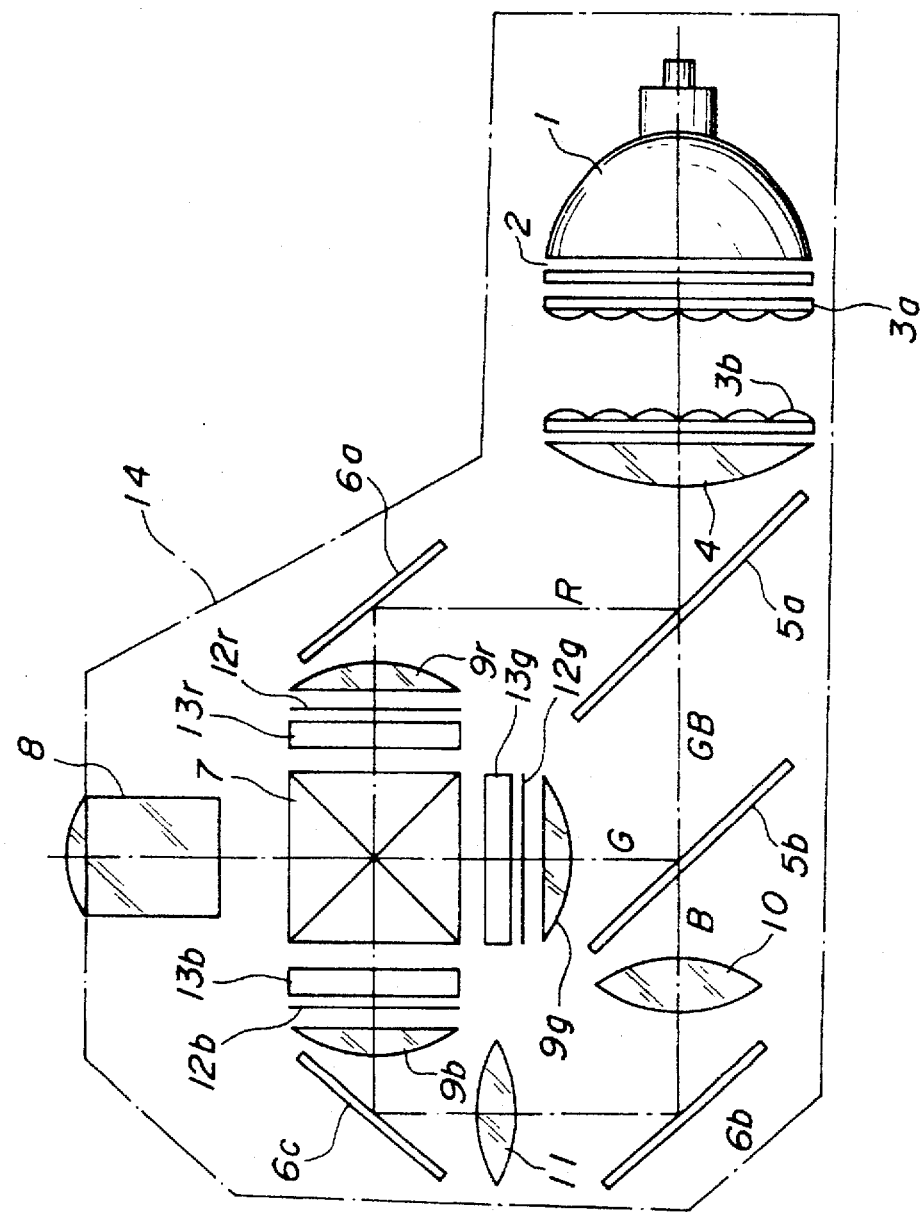
FIG. 1 is a plane view showing an arrangement of a projector according to an embodiment of the present invention.
Figure 2:
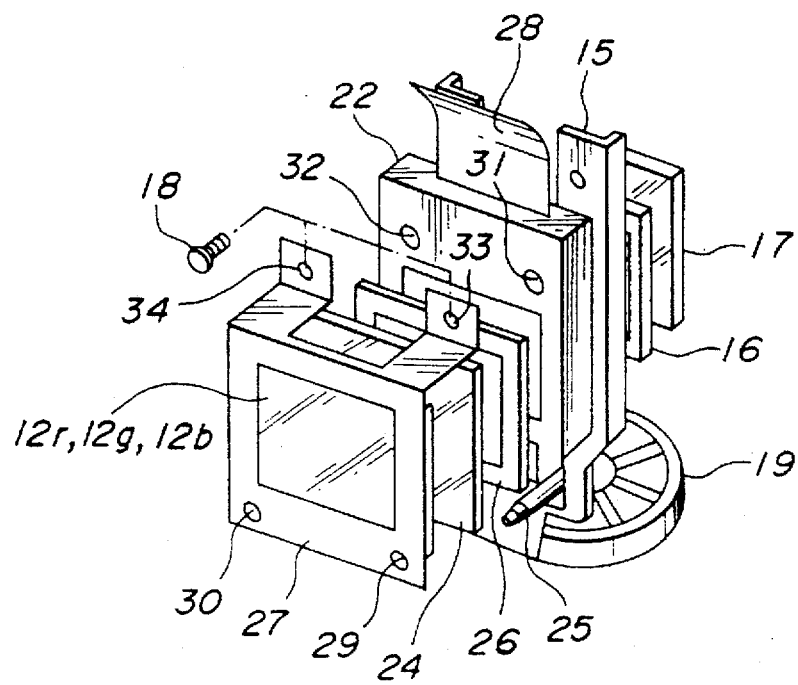
FIG. 2 is a perspective view showing an arrangement of an essential portion of the projector shown in FIG. 1.
Figure 3:
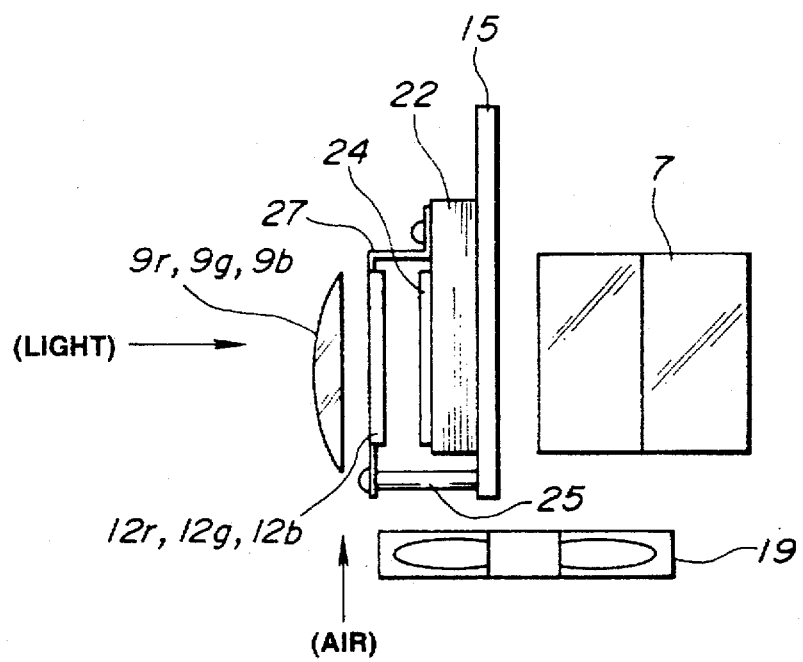
FIG. 3 is a side view showing an arrangement of an essential portion of the projector shown in FIG. 1.
Figure 4:
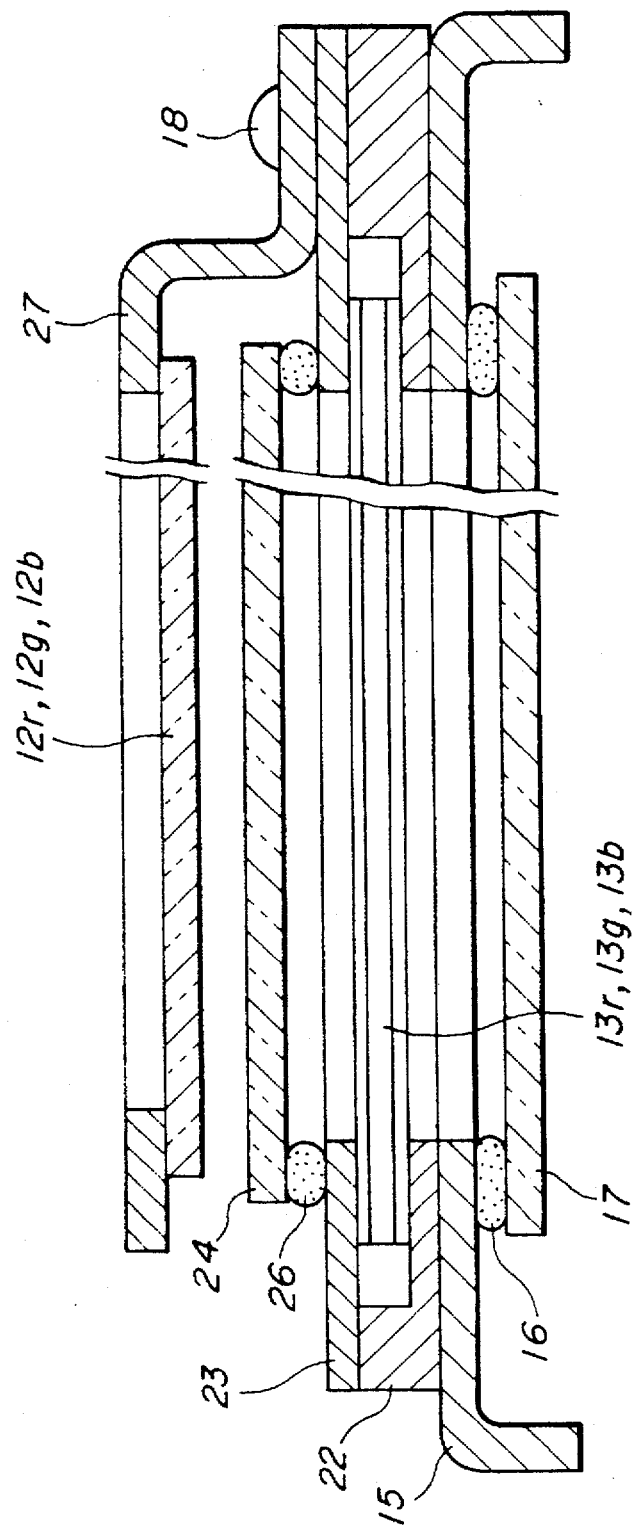
FIG. 4 is a vertical section showing an arrangement of an essential portion of the projector shown in FIG. 1.
Figure 5:
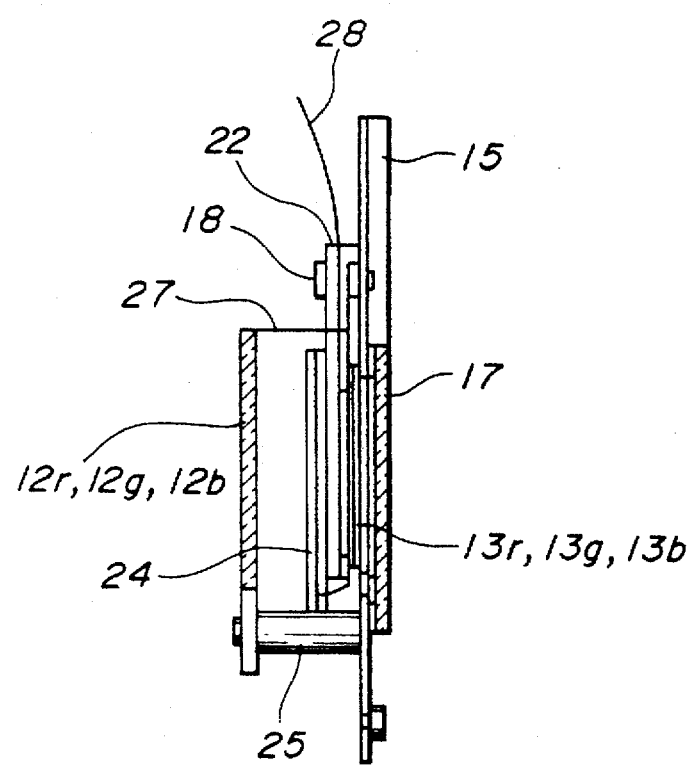
FIG. 5 is a side view showing an arrangement of an essential portion of the projector shown in FIG. 1.

As shown in FIG. 1, a projector according to an embodiment of the present invention includes a housing 14, in which are built a liquid crystal display (LCD) for a red color 13r, a LCD for a green color 13g and a LCD for a blue color 13b, these LCDs served as an image display panel. These LCDs 13r, 13g and 13b receive a video signal from a video signal feeding instrument (such as a TV tuner, a VTR device, and a video disk player) located outside of the housing 14 through a control circuit. Based on the video signal, the LCDs operate to display the corresponding image.

These LCDs 13r, 13g and 13b are image display panels of transparent type. They serve to display an image according to the variation (tone) of the transmittance. The LCD for a red color 13r operates to display a red component of the image corresponding to the video signal. The LCD for a green color 13g operates to display a green component of the image corresponding to the video signal. The LCD for a blue color 13b operates to display a blue component of the image corresponding to the video signal.

Inside of the housing 14, a light source 1 is located for illuminating the LCDs for respective colors 13r, 13g and 13b. This light source 1 is a white lamp with high luminance such as a halogen lamp.

A light flux emitted from the light source 1 is transmitted through a UV filter (Ultraviolet Rays Cutting Filter) 2, multi-lens arrays 3a, 3b, and a condenser lens 4 in sequence. Then, the light flux is incident on a first dichroic mirror 5a located at an angle of 45° against the light flux. The first dichroic mirror 5a operates to reflect a red light component R contained in the light flux for deviating it at 90° so that the remaining green and blue light components GB are transmitted through the mirror 5a.

The red light component R reflected on the first dichroic mirror 5a is reflected on a first mirror 6a to be deviated at 90°. The deviated red light component R passes through a condenser 9r and a dichroic filter for a red color 12r and then is incident on the LCD for a red color 13r. The dichroic filter for a red color 12r is a filter that transmits only the red light. The dichroic filter for a red color 12r contains a polarizing filter pasted thereon.

The red light incident on the LCD for a red color 13r is transmitted through the LCD for a red color 13r and then is incident on a cross-dichroic prism 7 at one side.

The green and blue light component GB transmitted through the first dichroic mirror 5a is incident on a second dichroic mirror 5b located at an angle of 45° against this light flux. The second dichroic mirror 5b operates to reflect the green light component G contained in the green and blue light component GB for deviating it at 90° so that the remaining blue light component B is transmitted.

The green light component G reflected on the second dichroic mirror 5b passes through the condenser lens 9g and the dichroic filter for a green color 12g and then is incident on the LCD for a green color 13g. The dichroic filter for a green color 12g is a filter that transmits only the green light. The dichroic filter 12g contains a polarizing filter pasted therewith.

The green light incident on the LCD for a green color 13g is transmitted through the LCD for a green color 13g and then is incident on the cross-dichroic prism 7 at the rear side.

The blue light component B transmitted through the second dichroic mirror 5b passes through a first condensing lens 10 and then is reflected on a second mirror 6b for deviating it at 90°. Then, the deviated light component passes through a second condensing lens 11 and then is reflected on a third mirror 6c for deviating it at 90°. The deviated light component passes through a condenser lens 9b and a dichroic filter for a blue color 12b and then is incident on the LCD for a blue color 13b. In addition, the first and the second condensing lenses 10 and 11 are used for condensing the blue light component, because the blue light component has a longer light path to the LCD 13b and is more easily diffused than the red or the green light component.

The dichroic filter for a blue color 12b is a filter that transmits only the blue light. This dichroic filter 12b contains a polarizing filter pasted thereon.

The blue light being incident to the LCD for a blue color 13b is transmitted through the LCD 13b and incident on the cross-dichroic prism 7 at its other side. The cross-dichroic prism 7 operates to synthesize the red light incident on one side, the green light incident on the rear side, and the blue light entered at the other side, and then inject the synthesized light at the front side.

The light flux injected from the cross-dichroic prism 7 is incident on the projecting lens 8. This projecting lens 8 operates to project the light flux outside in the forward direction of the housing 14. That is, the projecting lens 8 operates to project the image displayed on the LCDs 13r, 13g and 13b and illuminated by the light source 1 toward the front side. The projecting lens 8 is used for forming a real image displayed on the LCDs 13r, 13g and 13b on the screen located in front of the projector.

In this projector, as shown in FIGS. 2 to 5, the LCDs 13r, and 13b are supported by a supporting frame 22. This supporting frame 22 is composed of a square frame portion and a square parting plate 23. The square frame portion supports the rear sides of the outer peripheral portions of the LCDs 13r, 13g and 13b, from which rear sides the light flux is injected after it is transmitted through the LCDs. The square parting plate 23 supports the front sides of the peripheral portions of the LCDs 13r, 13g and 13b located in the front sides of the square frame portion, from which front sides the light flux is incident on the LCDs 13r, 13g and 13b.

In front of the parting plate 23, a filter supporting frame is located for supporting the dichroic filters for respective color lights 12r, 12g and 12b. This filter supporting frame 27 is composed of a square frame portion and a supporting leg portion. The square frame portion supports the outer peripheral sides of the dichroic filters 12r, 12g and 12b. The supporting leg portion is extended from the upper edge of the square frame portion to the rear side.

The filter frame 27 and the supporting frame 22 composed of the parting plate 23 and the frame portion are fastened on a supporting plate 15 held inside of the housing 14 with a pair of screws 18. Concretely, the pair of screws 18 are penetrated into the corresponding pair of holes 33 and 34 formed in the supporting leg portion of the filter frame 27. Next, the screws 18 and 18 are further penetrated into a pair of holes 31 and 32 formed in the upper side portion of the parting plate 23 and then penetrated into a pair of holes formed in the upper side portion of the frame portion. Lastly, the screws 18 and 18 are fitted into the corresponding pair of holes formed in the supporting plate 15. The lower edge side of the supporting frame 22 is pressed and supported by a flat spring mounted on this supporting plate 15.

The supporting plate 15 contains square holes formed therein. Those square holes correspond to the LCDs 13r, 13g and 13b, respectively.

In the filter frame 27, the dichroic filters 12r, 12g and 12b are fixedly located in a manner to keep a predetermined distance of 5 to 10 mm from the LCDs 13r, 13g and 13b on the front sides of the LCDs 13r, 13g and 13b, from which sides the light flux is entered into the LCDs 13r, 13g and 13b. The lower edge portion of the filter frame 27 is supported by a pair of stud pins 25 and 25 standing on the front side of the supporting plate 15. That is, the lower edge portion of the filter frame 27 contains a pair of holes 29 and 30 which mate with grooves formed on the tip sides of the stud pins 25 and 25.

The filter frame 27 is constructed to adjust the rotation angles of the dichroic filters 12r, 12g and 12b around an optical axis against the LCDs 13r, 13g and 13b. That is, the pair of holes 33 and 34 and the pair of holes 29 and 30 formed in the filter frame 27 are located on a circle having as a center of a curvature the centers of the dichroic filters 12r, 12g and 12b.

The LCDs 13r, 13g and 13b are hermetically held by a front side glass 24 and a rear side glass 17 the peripheral portions of which are supported by the supporting frame 22. The front side glass 24 transmits the light flux. The light flux is traveled from the light source 1 to the LCDs 13r, 13g and 13b. The peripheral portion of the front side glass 24 is pasted with the front portion of the parting plate 23 with an adhesive agent 26. The front side glass 24 is located to keep a predetermined interval from the LCDs 13r, 13g and 13b. The rear side glass 17 transmits the light flux which is transmitted through and injected from the LCDs 13r, 13g and 13b. The peripheral portion of the rear side glass 17 is pasted with the rear portion of the supporting frame 22 with an adhesive 16.

In the projector, an intake hole is formed on the bottom of the housing 14. This intake hole is used for taking outside air. The intake hole has an air filter mounted therein. The air filter serves to remove dust in the air passing through the intake hole. The housing 14 has a cooling fan 19 mounted therein. The cooling fan 19 is located in a manner to correspond to the intake hole. The cooling fan 19 is driven by a motor and serves to draw the outside air in the housing 14 through the intake hole and send the air to the portion around the LCDs 13r, 13g and 13b.

The dichroic filters 12r, 12g, 12b, the front and the rear side glasses 24 and 17, and the LCDs 13r, 13g and 13b are heated by the application of the light of the light source 1. However, those components are cooled down by the outside air injected by the cooling fan 19. The outside air injected into the housing 14 by the cooling fan 19 are distributed into the LCDs 13r, 13g and 13b at a proper ratio through the effect of a wind guide located inside of the housing 14.

The dichroic filters 12r, 12g, 12b and the front side glass 24 are located closer to the light source 1 than the LCDs 13r, 13g and 13b. Hence, those filters and the front side glass are most likely to be heated. The dichroic filters 12r, 12g and 12b and the front side glass 24 are located so that they keep an interval from the LCDs 13r, 13g and 13b through an air layer. Hence, if those filters and the front side glass 24 are heated up, the heat is not to be conducted to the LCDs 13r, 13g and 13b.

Even if the outside air contains dust passed through the air filter, the dust does not adhere to the LCDs 13r, 13g and 13b though it may adhere to the dichroic filters 12r, 12g and 12b and the front side and the rear side glasses 24 and 27. This is because the LCDs 13r, 13g and 13b are hermetically held by the supporting frame 22 and the front side and the rear side glasses 24 and 17.

If the dust adheres to the dichroic filters 12r, 12g and and the glasses 24 and 17, they are located at a distance from the LCDs 13r, 13g and 13b. Hence, the shadow of the dust has little adverse effect on the image projected on the screen. This is because the object points for a real image formed on the screen through the effect of the projecting lens 8 are matched to an image displayed on the LCDs 13r, 13g and 13b.

Figure 8:
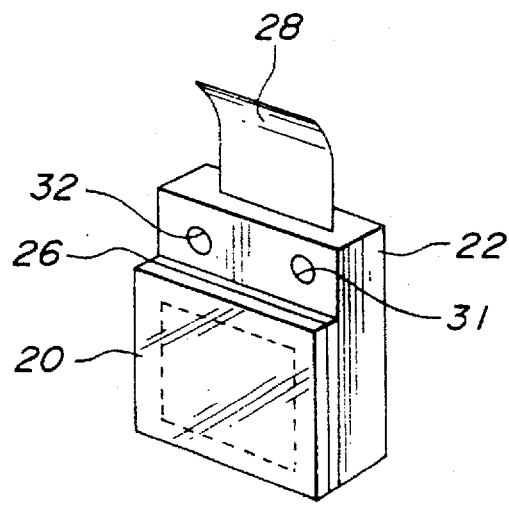
FIG. 8 is a perspective view showing another arrangement of an essential portion of the projector shown in FIG. 1.

In this projector, as shown in FIG. 8, the front side glass may be a glass 20 attached with an aluminium thin film. This glass 20 is made by uniformly coating of aluminium fine powder on the surface of the glass and sintering the coat-applied glass. The coat has a thickness of 1 μm to 2 μm.

Since the glass 20 with an aluminium film has a high heat conductivity, if the glass 20 is heated by the application of the light from the light source 1, the glass 20 is properly cooled down by the outside air injected by the cooling fan 10.

Figure 6:
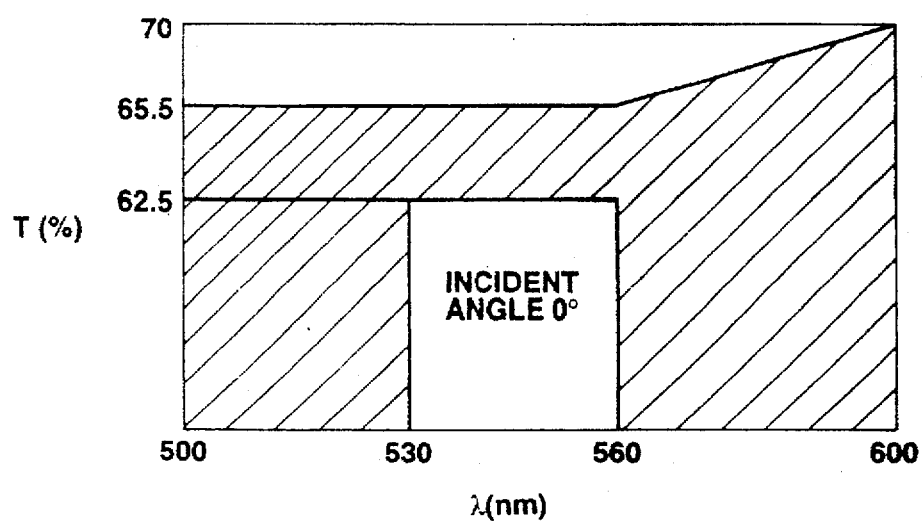
FIG. 6 is a graph showing an optical characteristic of the front side glass served as a neutral density filter (ND filter)

The front side glass 24 has a metallic thin film formed on the surface thereof. As shown in FIG. 6, hence, the front side glass 24 is served as a neutral density filter (ND filter) having a constant transmittance in the range of a constant wavelength band (for examples 530 nm to 560 nm).

By properly setting a transmittance of the front side glass 24, it is possible to adjust a quantity of the light flux incident on the LCDs 13r, 13g and 13b and keep the quantity of the incident light well-balanced about the LCDs 13r, 13g and 13b. That is, by setting a transmittance of the front side glass 24, it is possible to set to a proper ratio a light quantity ratio of each color component of the light flux transmitted through the LCDs 13r, 13g and 13 and incident on the cross-dichroic prism 7, and keep the red, green and blue color states of the image projected through the projecting lens 8 well-balanced.

Figure 7:
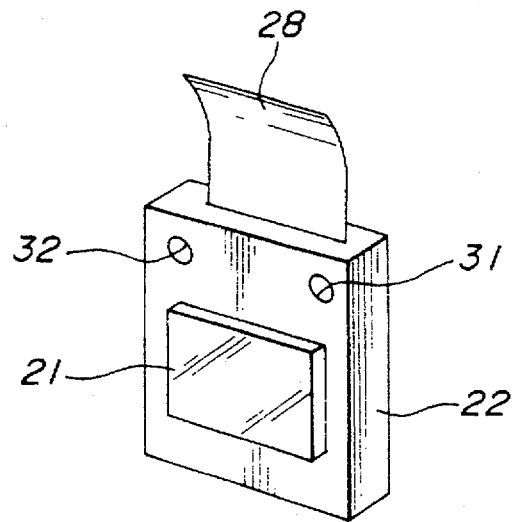
FIG. 7 is a perspective view showing another arrangement of an essential portion of the projector shown in FIG. 1.

Further, as shown in FIG. 7, in the projector, the front side glass may be a quartz glass 21. Since this quartz glass 21 has a high heat conductivity, if the glass 21 is heated by the application of the light from the light source 1, the glass may be properly cooled down by the outside air injected from the cooling fan 19.

The liquid crystal device projector is described above as an example of the present invention. But the present invention is also applied to any kinds of projectors having an image display panel displaying an image based on an image signal thereon.

Many widely different embodiments of the present invention may be constructed without departing from the spirit and scope of the present invention. It should be understood that the present invention is not limited to the specific embodiments described in the specification, except as defined in the appended claims.

What is claimed is:

1. A projector for use with a screen comprising:
   an image display panel for displaying an image based on a video signal fed thereto;
   a light source for applying light to said image display panel;
   a projecting lens for projecting the image from said image display panel to the screen; and
   a supporting frame for supporting said image display panel and being sealed by a front glass and a rear glass, wherein said light from said light source is input through said front glass and output from said rear glass and wherein said front glass has a metal thin film on a surface thereof having neutral density filter characteristics.

2. The projector according to claim 1, further comprising:
   a condenser lens;

a dichroic filter disposed between said front glass and said condenser lens.

3. The projector according to claim 2, further comprising a filter supporting frame for supporting said dichroic filter.

4. The projector according to claim 1, wherein said image display panel includes a red color panel, a green color panel, and a blue color panel and further comprising a cross-dichroic prism for synthesizing a red light, a green light and a blue light from said red color panel, said green color panel, and said blue color panel, respectively, to produce synthesized light and for supplying said synthesized light to said projection lens.

5. The projector according to claim 1, further comprising:

a dichroic filter;

a cooling fan for cooling said image display panel, said dichroic filter, and said front glass and said rear glass.

6. The projector according to claim 1, wherein said front glass and said rear glass are supported by said supporting frame.

7. The projector according to claim 1, wherein said metal thin film on said front glass surface is coated with an aluminum powder and sintered.

8. A projector for use with a screen comprising:

an image display panel for displaying an image based on a video signal fed thereto;

a light source for applying light to said image display panel;

a projecting lens for projecting the image from said image display panel to the screen; and a supporting frame for supporting said image display panel and being sealed by a front glass and a rear glass, wherein said light from said light source is input through said front glass and output from said rear glass and wherein said front glass is made of quartz glass.

9. A projector for use with a screen, comprising:

image display means including a red color panel, a green color panel, and a blue color panel for displaying an image based on a video signal being fed thereto and sealed by a front glass and a rear glass, wherein said front glass has a metal thin film on a surface thereof having neutral density filter characteristics;

a light source for applying light to said image display means;

a projecting lens for projecting an image to said screen;

a condenser lens;

a dichroic filter disposed between said front glass and said condenser lens;

a cross-dichroic prism for synthesizing a red light, a green light and a blue light from said red color panel, said green color panel and said blue color panel, respectively, to produce synthesized light and for supplying said synthesized light to said projection lens; and a cooling fan for cooling said image display means, said dichroic filter, and said front glass and said rear glass, wherein said light from said light source is input through said front glass and output from said rear glass.

* * * * *